United States Patent Office 3,434,475
Patented Mar. 25, 1969

3,434,475
PROCESS FOR THE TREATMENT OF CERTAIN CHEST AND LUNG DISORDERS
Richard H. Adler, Room 610, 120 Delaware Ave., Buffalo, N.Y. 14202
No Drawing. Filed June 24, 1966, Ser. No. 560,058
Int. Cl. A61m 31/00, 7/00; A61l 13/00
U.S. Cl. 128—260      7 Claims This invention relates to a novel process for the treatment of certain chest and lung disorders. In one aspect, this invention relates to a novel process for producing pleural symphysis.

Heretofore a collection of air or fluid within the thoracic cavity leading to variable degrees of collapse of the lung has been associated as a complication in a variety of thoracic disorders including the formation of pulmonary blebs and bullae, malignant pleural effusions, chylothorax, emphysema, and the like. The treatment of the pneumothorax or recurring pleural effusion, occasionally required surgery to promote a fusion of lung (visceral pleura) to chest wall. This treatment involved a major operative incision of the chest wall, followed by mechanical abrasion, induced inflammation, or removal of the pleura lining in order to create an inflammatory reaction which resulted in fusion of the lung to the chest wall.

A large variety of chemical irritants and other substances have been injected, instilled, or insufflated into the thoracic cavity to achieve this end. Practically all fail to meet the desired objectives and many are associated with adverse reactions. The insufflation of talc by means of a hand nebulizer is one of the oldest methods in use. It is still widely practiced today, particularly outside the United States. This method, however, results in spotty distribution of talc and the surgeon frequently needs to inspect the inside of the chest by means of a thoracoscope.

Talc has also been used successfully at the time of open thoracotomy by sprinkling talc powder over the lung, or by smearing a pastry suspension of talc over the lung surface.

The need for some method to produce pleural symphysis which does not require major surgery is attested to by the vast literature on the subject. As beneficial as the known techniques are, their use is limited. In many instances, particularly among the elderly, or debilitated, it is neither advisable nor desirable to perform chest surgery and hence no direct means are available to effectively and permanently obliterate the pleural space in such cases. Additionally, even when the patient's condition is such that surgery can be performed, the known methods for effecting pleural symphysis were not without their disadvantages as previously indicated.

It is therefore an object of this invention to provide a novel process for the treatment of certain chest and lung disorders. Another object is to provide a novel process for producing pleural symphysis. A further object of this invention is to provide a process for effecting pleural symphysis which can be employed on patients who normally could not withstand surgery. A still further object of this invention is to provide a novel process for effecting pleural symphysis which does not require major chest surgery. Another object is to provide a novel process for administering to the thoracic cavity a finely divided, evenly distributed, insufflation of talc powder, sufficient to produce pleural symphysis. These and other objects will readily become apparent to those skilled in the art in the light of the teachings herein set forth.

In its broad aspect, the invention relates to a novel process for producing pleural symphysis which avoids the necessity for major thoracic surgery. The process comprises administering to a patient through an opening in the chest wall a three-phase, self-propelling aerosol system. The system which is contained in a pressurized container, comprises (a) a free-flowing, dry powdered composition including the active ingredient to effect pleural symphysis, the active ingredient being only sparingly soluble in a vaporizable propellent, (b) a second ingredient of the composition being highly sorbent of the vaporizable propellent and (c) the vaporizable propellent maintained in a sorbed condition by the powder composition under the vapor pressure of the propellent normally existing in the container at the ambient temperature.

The method of this invention possesses numerous advantages over previous methods heretofore employed to effect pleural symphysis. Using the aerosolized talc of this invention, the surgeon is able to produce a uniformly thin covering of powder over the pleural surface, a feat not possible using prior techniques. Due to the presence of the propelling vehicle and the fluidizing effect of the sorbent material on the talc, this system allows for a cloud-like dispersion of a dry talc powder throughout the hemithorax. With this system, the surgeon is reassured of an even distribution which eliminates the need for continued internal inspection during the procedure and greatly simplifies the method of delivery of talc powder. All of this can be done through a small hole punched in the chest wall using a trocar. Additionally, since the talc is delivered through a small catheter temporarily inserted into the chest wall, the operation can be performed under local anesthesia, even at the patient's bedside, thus circumventing the need for major thoracic surgery. Also of paramount importance, is the shortened time required to administer the talc to the pleural spaces, thus permitting this method to be used on patients who due to age or condition could not otherwise undergo prolonged major chest surgery.

A further imprtant aspect following talc aerosol insufflation by the process of this invention is that the catheter can be left in the chest through the trocar opening and suction applied for 1 or 2 days to ensure contact between the lung and chest wall, thereby allowing fusion of the two to take place.

In practice, the particular techniques for administering the powdered composition to the pleural space will be chosen by the attending surgeon or physician. Excellent results are obtained by making a small opening through the chest wall with a throcar. Thereafter, a catheter attached to the aerosol system is inserted through the throcar to the pleural space and the desired dosage of the powdered composition administered. It is preferred that the tip of the catheter be of such design that the direction of spray is approximately perpendicular to the throcar. In this manner the surgeon can turn the aerosol container through 360° and insure even distribution throughout the entire plueral space.

The effective dosage of the compounds of this invention depends upon the severity, the stage and the individual characteristics of each case, will be determined by the attending surgeon. Generally, a dosage range of from 2 to about 10 grams is preferred.

As hereinbefore indicated, the self-propelled aerosol system utilized in the present invention comprises a three-phase system including a vapor phase and a homogeneous, free-flowing powdered composition, the latter containing a vaporizable propellent. The powder composition which constitutes a major portion of the system, provides the supporting phase. This powder composition is made up of the active and fluidizing materials to be dispensed from the container, and means for holding the liquefied propellent at the vaporization pressure of said propellent at the ambient temperature of the pressurized system.

The preferred powdered composition employed in the aerosol system to effect pleural symphysis is finely divided talc. Talc as was heretofore known, creates an inflammatory reaction when it is brought into contact with the pleural surface. However, prior to the instant invention it had not been possible to provide a uniform thin covering of the powder over the pleural surface. The particular aerosol system used in the present invention has the advantage of delivering a dry, finely divided powder composition in a uniform stream. In practice, U.S.P. talc having a particle size of less than 100 mesh has been found to be satisfactory. Although the talc itself can serve as the sorbent material, it is preferred to employ a separate non-toxic sorbent material on which to hold the propellent. Although a variety of materials can be employed as the propellent-sorbent material, finely divided calcium silicate, i.e., Microcel B, is preferred. The sorbent material should likewise have a mesh size less than 100.

In general, the ratio of talc, to sorbent material is not necessarily critical and can range from about 1 weight percent talc to 99 weight percent sorbent material, to 99 weight percent talc to 1 weight percent sorbent material. However, it is preferred that talc constitutes the major portion of the powder composition. A highly preferred ratio is 60 to 90 weight percent talc to 40 to 10 weight percent sorbent material.

Ideally, the powder dispensed as the active ingredient in the aerosol system of this invention is capable of holding in the sorbed condition the required volume of propellent. When this is not the case, however, and the powder is only sparingly sorbent of the propellent, a further propellent carrier medium is included in the aerosol mixture. A number of carriers which have been found to possess the derised sorption qualities include materials such as amorphous silica, cystalline silicates, and the like.

The powder mixtures which may be dispensed by the present system includes, as previously mentioned, a wide variety. Essential for achieving a compatible system, however, there are certain characteristics required. Primarily, the powder composition must be capable of holding in an absorbed or adsorbed state all of the liquefied propellent necessary to dispense the container charge. The particle or mesh size of the powder imposes no strict limitation on the operability of the system except as imposed by the aerosol container valve structure. In this respect, we have found that a desirable powder size is less than about 30 mesh, and usually less than 100 mesh.

Also, in that the aerosol composition as contained with constitute a three-phase system, the powder must be insoluble in the liquid propellent employed. These propellents, broadly speaking, include hydrocarbons, fluorocarbon, and other gases liquefiable at ambient temperature. Some specific propellents include trichloro-monofluoromethane (Ucon 11), monochlorodifluoromethane (Ucon 22), azetropes of dichlorodifluorometane and difluoroethane.

The preferred propellent employed in the present novel system may be one of those fluids normally associated with aerosol devices or mixture of any of said fluids. In order to function properly, the propellent must have a relatively low boiling point as to be vaporizable from the sorbent powder upon activation of the container valve. Examples of propellents which are preferred for the purpose of this invention are dichlorodifluoromethane (Ucon 12) and dichlorotetrafluoroethane (Ucon 114).

For the ordinary metallic aerosol container, the internal pressure head caused by vaporization of the propellent is generally about 10 to 70 pounds per square inch gauge 1. For heavier containers, however, which are able to withstand greater pressures, lower boiling propellents may be used. We have found that when Ucon 12 is the propellent, a container vapor pressure of about 70 p.s.i.g. at 70° F. is to be expected. When a lesser pressure is desired, a preferred mixture of propellents such as Ucon 11 or Ucon 114 with Ucon 12 will lower the pressure generally in proportion to the amount of said propellents in the mixture.

From the foregoing description, it is readily seen that the novel self-propelled powder aerosol system possesses many advantages. A completely dry powder spray may now be employed in the present process without fear of non-uniform distribution. Also, it has been shown that efficiencies of from 90 to 98% are realized so that the maximum benefit of the dispensed dust is achieved.

For further information regarding the powdered aerosol system used in the process of this invention, reference is made to U.S. Patent No. 3,081,223.

The effectiveness of the process of this invention were confirmed clinically in man, a representative clinical history being as described below. The aerosol system employed consisted of 3 ounces of an 80:20 talc-Microcel B mixture contained in a 6 fluid ounce aerosol can equipped with valve and catheter and which utilized dichlorodifluoromethane (Ucon 12) as the propellent.

A 61-year-old male, suffering from emphysema, had two recurrences of penumothorax with approximately 20 percent collapse of the lung resulting in severe shortness of breath. These two recurrences were treated by a catheter with under water seal and suction. After the patient had a third recurrence, approximately 10 grams of talc were insufflated into the pleural space by the process of this invention. No adverse effects from the talc were observed and after eight months there were no further recurrences or evidence of pulmonary collapse. From this typical case history, it is evident that the process of this invention is effective in producing pleural symphysis.

Another embodiment of this invention is that the entire system including aerosol container, valve and catheter can be packaged and conveniently sterilized as one unit. For instance, the aerosol container, valve and catheter can be enclosed within a transparent plastic bag and sterilized by exposing to gamma radiation. In one instance, a system consisting of a six-ounce aerosol container which had been filled with three ounces of 80:20 weight percent U.S.P. talc calcium silicate (Microcel B) was sterilized by exposure to two and one half megarads.

Although the invention has been illustrated by the above disclosure it is not to be construed as being limited to the materials emphasized therein, but rather, it encompasses the generic areas as hereinbefore disclosed. Various modifications and embodiments of this invention can be made without departing from the spirit and scope thereof.

What is claimed is:

1. A method for producing pleural symphysis which comprises insufflating a finely divided dry powder into the pleural space within the thoracic cavity through a catheter inserted into the chest wall, said powder being administered from a three-phase self-propelling aerosol system comprising a free flowing powdered composition, at least one component of said composition being finely divided talc and at least one other component of said composition being particles of a non-toxic liquid propellent-sorbent material, and a vaporizable propellent, a portion of which propellent is held in said sorbent material under the vapor pressure of said propellent normally existing within the container, and the proportion of said propellent and said powdered composition being such that said powdered composition remains free flowing at all times.

2. The method of claim 1 wherein said liquid propellent-sorbent material is calcium silicate.

3. The method of claim 1 wherein said vaporizable propellent is trichloromonofluoromethane.

4. The method of claim 1 wherein said vaporizable propellent is dichlorodifluoromethane.

5. The method of claim 1 wherein said vaporizable propellent is monochlorodifluoromethane.

6. The method of claim 1 wherein said vaporizable propellent is dichlorotetrafluoroethane.

7. A sterile, self-propelled powder aerosol system enclosed within a sealed cover, said system comprising in combination a pressurized container having a dispensing valve and catheter attached thereto, and containing a free-flowing powdered composition, at least one component of said composition being finely divided talc and at least one other component of said composition being particles of a non-toxic liquid propellent-sorbent material, and a vaporizable propellent, a portion of which propellent is held in said sorbent material under the vapor pressure of said propellent normally existing within the container, and the proportion of said propellent and said powdered composition being such that said powdered composition remains free flowing at all times.

References Cited

UNITED STATES PATENTS

| | | | |
|---|---|---|---|
| 2,544,931 | 3/1951 | Marco | 128—260 |
| 3,081,223 | 3/1963 | Gunning et al. | 167—39 |

ADELE M. EAGER, *Primary Examiner.*

U.S. Cl. X.R.

128—266; 167—39; 206—59